United States Patent
Zhao et al.

(10) Patent No.: US 11,118,450 B2
(45) Date of Patent: Sep. 14, 2021

(54) METHOD FOR SIMULATING THE DISCONTINUITY OF THE HYDRAULIC FRACTURE WALL IN FRACTURED RESERVOIRS

(71) Applicant: SOUTHWEST PETROLEUM UNIVERSITY, Chengdu (CN)

(72) Inventors: Jinzhou Zhao, Chengdu (CN); Qiang Wang, Chengdu (CN); Yongquan Hu, Chengdu (CN); Lan Ren, Chengdu (CN); Chaoneng Zhao, Chengdu (CN); Jin Zhao, Chengdu (CN); Ran Lin, Chengdu (CN)

(73) Assignee: SOUTHWEST PETROLEUM UNIVERSITY, Chengdu (CN)

(*) Notice: Subject to any disclaimer, the term of this patent is extended or adjusted under 35 U.S.C. 154(b) by 0 days.

(21) Appl. No.: 16/929,108

(22) Filed: Jul. 15, 2020

(65) Prior Publication Data
US 2020/0347721 A1  Nov. 5, 2020

(30) Foreign Application Priority Data
Dec. 4, 2019 (CN) .......................... 201911225898.1

(51) Int. Cl.
*E21B 49/00* (2006.01)
*E21B 47/003* (2012.01)
(Continued)

(52) U.S. Cl.
CPC .......... *E21B 49/003* (2013.01); *E21B 47/003* (2020.05); *E21B 49/005* (2013.01);
(Continued)

(58) Field of Classification Search
CPC .... E21B 49/003; E21B 47/003; E21B 49/005; G01V 99/005; G06F 17/16
(Continued)

(56) References Cited

U.S. PATENT DOCUMENTS 8,494,827 B2 *  7/2013  Mutlu ...................... G01V 9/00
                                                703/10
9,152,745 B2 * 10/2015  Glinsky ............... G01V 99/005
(Continued)

OTHER PUBLICATIONS

Jing Zhou (Hydraulic Fracture Propagation Modeling and Data-Based Fracture Identification,2016, The University of Utah) (Year: 2016).*

(Continued)

*Primary Examiner* — Iftekhar A Khan

(57) ABSTRACT

The invention discloses a method for simulating the discontinuity of the hydraulic fracture wall in fractured reservoirs, comprising the following steps: establish a physical model of the natural fracture; establish a hydraulic fracture propagation calculation equation; establish a natural fracture failure model, calculate the natural fracture aperture, and then calculate the natural fracture permeability, and finally convert the natural fracture permeability into the permeability of the porous medium; couple the hydraulic fracture propagation calculation equation with the permeability of the porous medium through the fracture propagation criterion and the fluid loss to obtain a pore elastic model of the coupled natural fracture considering the influence of the natural fracture; work out the stress and displacement distribution of the hydraulic fracture wall with the pore elastic model of the coupled natural fracture, and analyze the offset and discontinuity of the hydraulic fracture wall according to the displacement.

4 Claims, 4 Drawing Sheets

(51) Int. Cl.
*G01V 99/00* (2009.01)
*G06F 17/16* (2006.01)

(52) U.S. Cl.
CPC ............ *G01V 99/005* (2013.01); *G06F 17/16* (2013.01); *E21B 2200/20* (2020.05); *G01V 2210/646* (2013.01)

(58) Field of Classification Search
USPC .......................................................... 703/10
See application file for complete search history.

(56) References Cited

U.S. PATENT DOCUMENTS

| | | | | |
|---|---|---|---|---|
| 2010/0191470 A1* | 7/2010 | Tabanou | ................... | G01V 3/28 702/7 |
| 2010/0256964 A1* | 10/2010 | Lee | ........................ | G01V 11/00 703/10 |
| 2011/0077918 A1* | 3/2011 | Mutlu | ..................... | G06F 30/23 703/2 |
| 2011/0120718 A1* | 5/2011 | Craig | ....................... | E21B 43/16 166/308.1 |
| 2011/0125471 A1* | 5/2011 | Craig | ....................... | G01V 1/42 703/6 |
| 2011/0125476 A1* | 5/2011 | Craig | ....................... | G01V 1/288 703/10 |
| 2012/0232872 A1* | 9/2012 | Nasreldin | ............ | G01V 99/005 703/10 |
| 2012/0310613 A1* | 12/2012 | Moos | ..................... | G01V 11/00 703/10 |
| 2013/0284438 A1* | 10/2013 | Dusseault | ............. | E21B 43/267 166/280.1 |
| 2013/0292124 A1* | 11/2013 | Bunger | .................. | E21B 43/26 166/308.1 |
| 2014/0076543 A1* | 3/2014 | Ejofodomi | ............. | G01V 1/306 166/250.1 |
| 2014/0151033 A1* | 6/2014 | Xu | .......................... | E21B 43/26 166/250.01 |
| 2014/0222393 A1* | 8/2014 | Bai | ....................... | G01V 99/005 703/2 |
| 2014/0299315 A1* | 10/2014 | Chuprakov | ............. | E21B 47/00 166/250.1 |
| 2014/0372089 A1* | 12/2014 | Weng | ...................... | E21B 43/26 703/2 |
| 2015/0204174 A1* | 7/2015 | Kresse | .................... | E21B 43/26 166/250.01 |
| 2015/0377005 A1* | 12/2015 | Garcia-Teijeiro | ...... | G01V 1/288 703/10 |
| 2016/0108705 A1* | 4/2016 | Maxwell | ............... | E21B 43/267 166/250.1 |
| 2016/0265331 A1* | 9/2016 | Weng | ...................... | G06F 30/20 |
| 2016/0357883 A1* | 12/2016 | Weng | ..................... | E21B 43/267 |
| 2017/0059742 A1* | 3/2017 | Mookanahallipatna Ramasesha | .......... | G01V 99/005 |
| 2017/0067337 A1* | 3/2017 | Havens | ................... | E21B 47/16 |
| 2017/0275970 A1* | 9/2017 | Crawford | ............. | G01V 99/005 |
| 2017/0316128 A1* | 11/2017 | Huang | .................... | G06F 30/20 |
| 2018/0016895 A1* | 1/2018 | Weng | ...................... | G01V 1/306 |
| 2018/0230783 A1* | 8/2018 | Weng | ...................... | E21B 43/267 |
| 2018/0293789 A1* | 10/2018 | Shen | ........................ | E21B 47/00 |
| 2019/0243017 A1* | 8/2019 | Klinger | .................. | G01V 1/301 |
| 2019/0331811 A1* | 10/2019 | Bocaneala | .......... | E21B 41/0092 |
| 2019/0377101 A1* | 12/2019 | Li | ............................ | E21B 47/06 |
| 2020/0095858 A1* | 3/2020 | Bouaouaja | ............ | E21B 49/006 |

OTHER PUBLICATIONS

Varahanaresh Kumar Sesetty (Simulation of Hydraulic Fractures and Their Interactions With Natural Fractures, 2012, Texas A&M University) (Year: 2012).*

* cited by examiner

METHOD FOR SIMULATING THE DISCONTINUITY OF THE HYDRAULIC FRACTURE WALL IN FRACTURED RESERVOIRS

TECHNICAL FIELD

The present invention relates to the technical field of hydraulic fractures, in particular to a method for simulating the discontinuity of the hydraulic fracture wall in fractured reservoirs.

DESCRIPTION OF PRIOR ART

For the study of hydraulic fracturing technology for unconventional reservoirs, most researchers consider the original porous elastic formation as elastic formation, and only consider the flow in the fracture as the fluid flow, ignoring the flow in the pore. This consideration is based on elastic mechanics, but it is far from the actual conditions of unconventional reservoirs. Therefore, the hydraulic fracture wall obtained in most studies is smooth and continuous. However, it can be seen from many experiments (Wang Yue. Fracture simulation based on large hydraulic fracturing experiment system in laboratory [J]. Progress in Geophysics, 2017, 32 (1): 408-413; Zhang Jian, Zhang Guoxiang, Li Liang, et al. Study on simulation and experiment of shale hydraulic fracturing [J]. Journal of Hefei University of Technology (Natural Science), 2019, 42 (4): 541-545) that the fracture wall formed after the hydraulic fracturing of the reservoir rock is not smooth and continuously distributed, but is uneven and discontinuous. This phenomenon is ignored in most studies, but the discontinuity of the hydraulic fracture wall has a great influence on the proppant migration. Therefore, conventional methods can no longer accurately simulate the actual conditions of hydraulic fractures in the fracturing process.

Furthermore, most of the current studies focus on the propagation path of hydraulic fractures in unconventional reservoirs and the intersection between hydraulic fractures and natural fractures (Li Xiao, He Jianming, Yin Chao, et al. Characteristics of the shale bedding planes and their control on hydraulic fracturing [J]. Natural Gas Geoscience, 2019, 40 (3): 653-660; Chen X, Li Y, Zhao J, Xu W, Fu D. Numerical investigation for simultaneous growth of hydraulic fractures in multiple horizontal wells[J]. Journal of Natural Gas Science and Engineering, 2018, 51:44-52). The purpose is to study the mechanism of the intersection between hydraulic fractures and natural fractures, and then to simulate and predict the network forming capacity and the stimulated volume of reservoirs during fracturing. However, due to the limitation of the calculation method, when the number of natural fractures increases, the calculation time increases exponentially and the computer is required to have higher performance and configuration (Roussel, N. P. and Sharma, M. M. Role of Stress Reorientation in the Success of Refracture Treatments in Tight Gas Sands [J]. SPE Prod & Oper, 2012, 27 (4): 346-355). Therefore, the original simulation method is no longer applicable to the field engineering practice. In addition, because the reservoir is considered as an elastomer rather than a porous elastic medium, there will be a large error in the calculation results of fluid loss and reservoir stress, which is also a disadvantage of the conventional method (Gao Q, Ghassemi A. Pore pressure and stress distributions around a hydraulic fracture in heterogeneous rock [J]. Rock Mechanics and Rock Engineering, 2017, 50(12), 3157-3173).

SUMMARY OF THE INVENTION

In view of the above problems, the present invention aims to provide a method for simulating the discontinuity of the hydraulic fracture wall in fractured reservoirs. Specifically, analyze the effects of natural fracture, hole elasticity and hydraulic drive, and the coupling effect between the fluid and the geologic stress in the fracturing process, then establish a new mathematical model based on the Biot theory, fluid-solid coupling principle, finite difference theory and multiphase seepage principle to simulate the multi-cluster hydraulic fracture propagation and analyze the hydraulic fracture wall discontinuity; use the mathematical model to predict the offset and uneven propagation of hydraulic fractures under the influence of the uneven stress in the dynamic fracturing process with different parameters in combination with the construction parameters, initial conditions and boundary conditions, so as to analyze the roughness of the fracture wall by analyzing the discontinuity of the fracture wall. Finally, it provides a guidance and reference for the proppant migration in hydraulic fractures.

The technical solution of the present invention is as follows:

A method for simulating the discontinuity of the hydraulic fracture wall in fractured reservoirs, comprising the following steps:

Acquire geological parameters of the fractured reservoir, and establish a physical model of the natural fracture based on the fracture continuum model according to the length, width, height and other physical conditions of the natural fracture;

Establish a hydraulic fracture propagation calculation equation on the basis of the in-fracture flow equation, fluid loss equation, width equation and material balance equation;

Establish a natural fracture failure model according to the Mohr-Coulomb rule, work out the natural fracture aperture according to the natural fracture failure model, calculate the natural fracture permeability based on the natural fracture aperture, and convert the fracture permeability into the permeability of the porous medium with the fracture continuum model;

Couple the hydraulic fracture propagation calculation equation with the permeability of the porous medium through the fracture propagation criterion and the fluid loss to obtain a pore elastic model of the coupled natural fracture considering the influence of the natural fracture;

Work out the stress and displacement distribution of the hydraulic fracture wall with the pore elastic model of the coupled natural fracture, and analyze the offset and discontinuity of the hydraulic fracture wall according to the displacement.

Further, the geological parameters are obtained by logging or fracturing, specifically including initial aperture of natural fracture, matrix initial permeability, initial porosity, elastic modulus and Poisson's ratio.

Further, the fracture continuum model is as follows:

$$k_{ij} = k_{nf} \begin{bmatrix} (n_2)^2 + (n_3)^2 & -n_1 n_2 & -n_3 n_1 \\ -n_1 n_2 & (n_2)^2 + (n_3)^2 & -n_2 n_3 \\ -n_3 n_1 & -n_2 n_3 & (n_2)^2 + (n_3)^2 \end{bmatrix} \quad (1)$$

Where,
$k_{ij}$ is the matrix permeability tensor, in m²;
$k_{nf}$ is the natural fracture permeability, in m²;
$n_1$, $n_2$ and $n_3$ are calculated as follows:

$$n_1 = \cos(\varsigma \frac{\pi}{180})\sin(\xi \frac{\pi}{180}) \quad (2)$$

$$n_2 = \cos(\varsigma \frac{\pi}{180})\cos(\xi \frac{\pi}{180})$$

$$n_3 = -\sin(\varsigma \frac{\pi}{180})$$

Where,
ç is the dip angle, in °;
ξ is the approaching angle, in °;
The natural fracture permeability $k_{nf}$ is calculated as follows:

$$k_{nf} = \frac{w_{NF}^3}{12d} \quad (3)$$

Where,
$w_{NF}$ is the natural fracture aperture, in m;
d is the natural fracture spacing, in m.

Further, the hydraulic fracture propagation calculation equation is worked out by substituting the in-fracture flow equation, fluid loss equation and width equation into the material balance equation; the substitution of in-fracture flow equation, fluid loss equation, width equation and the material balance equation are as follows:

$$\frac{\partial p_{HF}}{\partial s} = -\frac{64\mu}{\pi h_f w_{HF}^3} q \quad (4)$$

$$q_L = \frac{S}{\mu} f(p_{HF} - p_p) \quad (5)$$

$$w_{HF} = (u^+ - u^-) \cdot n \quad (6)$$

$$\frac{\partial q(s,t)}{\partial s} = q_L(s,t)h_f + \frac{\partial w_{HF}(s,t)}{\partial t}h_f \quad (7)$$

Where,
∂ is the partial differential symbol;
$p_{HF}$ is the pressure in the fracture, in Pa;
s is the coordinate of fracture length direction, in m;
μ is the fluid viscosity, in mPa·s;
$h_f$ is the hydraulic fracture height, in m;
$w_{HF}$ is the hydraulic fracture aperture, in m;
q is the flow in the hydraulic fracture, in m³/s;
$q_L$ is the fracturing fluid loss rate, in m/s;
S is the fracturing fluid loss area, in m²;
f is the fluid loss coefficient, in 1/m;
$p_p$ is the reservoir pore pressure, in MPa;
$u^+$ and $u^-$ are displacements on the left and right sides of the hydraulic fracture, in m;
n is the unit normal vector on the hydraulic fracture surface, dimensionless;
t is the fracturing time, in min.

Further, the natural fracture failure model is as follows:

$$\sigma_\tau > \tau_0 + \tan(\varphi_{basic})(\sigma_n - p_{NF}) \quad (8)$$

$$p_{NF} \geq \sigma_n + K_t \quad (9)$$

$$w_{NF} = a_0 + a_{NFT} + a_{NFS} \quad (10)$$

Where,
$\sigma_\tau$ is the shear stress on the natural fracture wall, in MPa;
$\tau_0$ is the natural fracture cohesion, in MPa;
$\varphi_{basic}$ is the basic friction angle, in °;
$\sigma_n$ is the normal stress on the natural fracture surface, in MPa;
$p_{NF}$ is the fluid pressure in the natural fracture, in MPa;
$K_t$ is the tensile strength of the natural fracture, in MPa;
$a_0$ is the initial aperture of the natural fracture, in m;
$a_{NFT}$ is the extensional aperture of the natural fracture, in m;
$a_{NFS}$ is the shear aperture of the natural fracture, in m.

Further, the basic friction angle is within a range from 30° to 40°.

Further, the pore elastic model of the coupled natural fracture is as follows:

$$\nabla \cdot [\mu \nabla u + \mu \nabla u^T + \lambda ltr(\nabla u)] + \nabla \cdot \sigma_i - b\nabla p_p + b\nabla p_i = 0 \quad (11)$$

$$\left(\frac{1}{M} + \frac{b^2}{K_{dr}}\right)\frac{\partial p_p^n}{\partial t} - \frac{b^2}{K_{dr}}\frac{\partial p_p^{n-1}}{\partial t} + b\frac{\partial(\nabla \cdot u)}{\partial t} - \frac{k_{ij}}{\mu}(\nabla^2 p_p^n) = q \quad (12)$$

Where,
∇ is the Laplacian operator;
u is the displacement tensor, in m;
T is the matrix transpose;
λ is the lame constant, in MPa;
ltr is the integral symbol;
$\sigma_i$ is the stress tensor, in MPa;
b is the Biot effective coefficient, dimensionless;
$p_i$ is the initial pore pressure, in MPa;
M is the Biot modulus, in MPa;
$K_{dr}$ is the bulk modulus in the drainage process, in MPa.

Compared with the prior art, the present invention has the following advantages:

In the process of the staged multi-cluster fracturing in the unconventional reservoirs, the present invention considers the effects of natural fractures on reservoir fluid flow, hydraulic fracture propagation, and stress distribution, and also considers the pore elastic effect of the reservoir, so as to accurately calculate the displacement and discontinuity of the hydraulic fracture wall with different number of fracture clusters and different fracturing time. In addition, when the number of natural fractures increases in multiples, the present invention directly calculates the matrix permeability tensor of natural fractures by the fracture continuum model, which solves the shortcoming in the prior art that each natural fracture needs to be calculated separately, causing heavy calculation amount. In summary, the present invention has an important role in the analysis of the proppant migration in hydraulic fracturing and the fracture conductivity after fracturing, and also has reference significance for the development of oil and gas fields and the enrichment of basic theories of hydraulic fracturing.

BRIEF DESCRIPTION OF THE DRAWINGS

In order to explain the embodiments of the present invention or the technical solutions in the prior art more clearly, the following will make a brief introduction to the drawings needed in the description of the embodiments or the prior art. Obviously, the drawings in the following description are merely some embodiments of the present invention. For those of ordinary skill in the art, other drawings can be obtained based on these drawings without any creative effort.

DETAILED DESCRIPTION OF THE PREFERRED EMBODIMENTS

Figure 1:
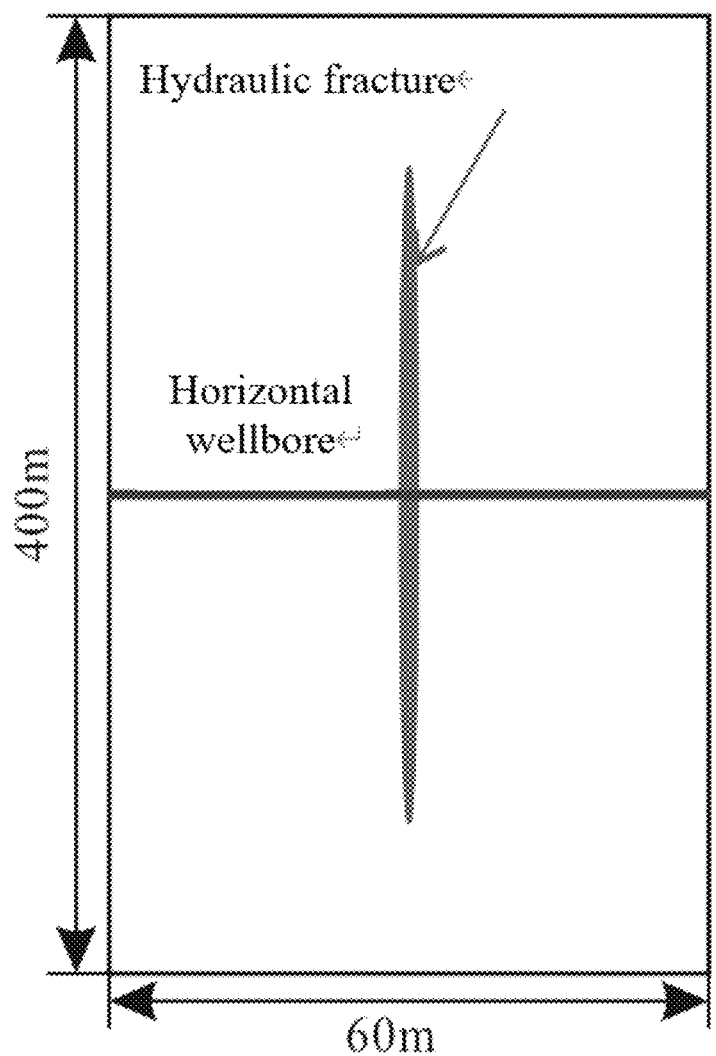
FIG. 1 is a schematic diagram of physical model of natural fracture in the present invention.
Figure 2:
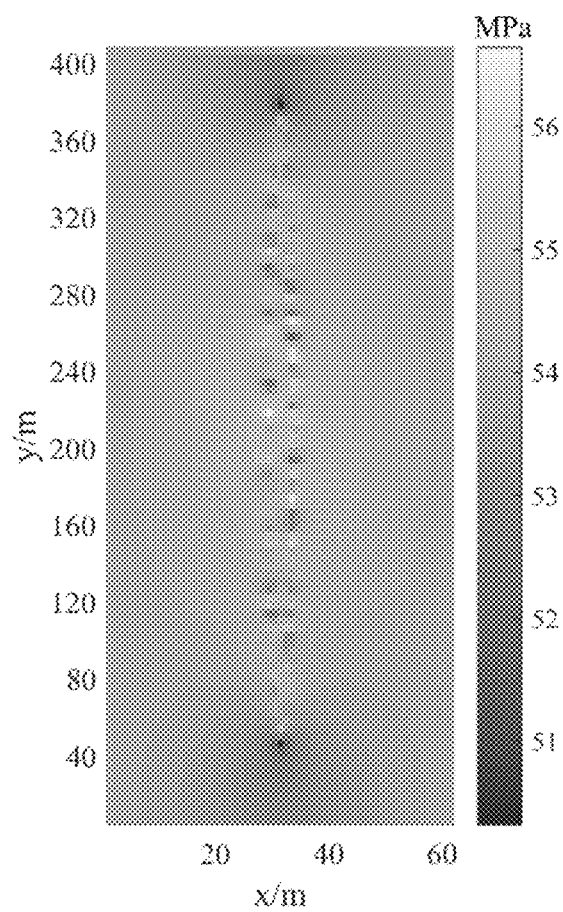
FIG. 2 is a cloud chart of stress distribution after fracturing in Embodiment 1.

The present invention is further described with reference to the drawings and embodiments. It should be noted that the embodiments in this application and the technical features in the embodiments can be combined with each other without conflict.

A method for simulating the discontinuity of the hydraulic fracture wall in fractured reservoirs, comprising the following steps:

Firstly, acquire geological parameters of the fractured reservoir, and establish a physical model of the natural fracture based on the fracture continuum model according to the length, width, height and other physical conditions of the natural fracture; the geological parameters are obtained by logging or fracturing, specifically including initial aperture of natural fracture, matrix initial permeability, initial porosity, elastic modulus and Poisson's ratio. The fracture continuum model is as follows:

$$k_{ij} = k_{nf} \begin{bmatrix} (n_2)^2 + (n_3)^2 & -n_1 n_2 & -n_3 n_1 \\ -n_1 n_2 & (n_2)^2 + (n_3)^2 & -n_2 n_3 \\ -n_3 n_1 & -n_2 n_3 & (n_2)^2 + (n_3)^2 \end{bmatrix} \quad (1)$$

Where,
$k_{ij}$ is the matrix permeability tensor, in m$^2$;
$k_{nf}$ is the natural fracture permeability, in m$^2$;
$n_1$, $n_2$ and $n_3$ are calculated as follows:

$$n_1 = \cos(\varsigma \frac{\pi}{180}) \sin(\xi \frac{\pi}{180}) \quad (2)$$

$$n_2 = \cos(\varsigma \frac{\pi}{180}) \cos(\xi \frac{\pi}{180})$$

$$n_3 = -\sin(\varsigma \frac{\pi}{180})$$

Where,
ç is the dip angle, in °;
ξ is the approaching angle, in °;
The natural fracture permeability $k_{nf}$ is calculated as follows:

$$k_{nf} = \frac{w_{NF}^3}{12d} \quad (3)$$

Where,
$w_{NF}$ is the natural fracture aperture, in m;
d is the natural fracture spacing, in m.

Secondly, establish the hydraulic fracture propagation calculation equation on the basis of the in-fracture flow equation, fluid loss equation, width equation and material balance equation, and work out it by substituting the flow equation, fluid loss equation and width equation into the material balance equation. The substitution of in-fracture flow equation, fluid loss equation, width equation and the material balance equation are as follows:

$$\frac{\partial p_{HF}}{\partial s} = -\frac{64\mu}{\pi h_f w_{HF}^3} q \quad (4)$$

$$q_L = \frac{S}{\mu} f(p_{HF} - p_p) \quad (5)$$

$$w_{HF} = (u^+ - u^-) \cdot n \quad (6)$$

$$\frac{\partial q(s,t)}{\partial s} = q_L(s,t) h_f + \frac{\partial w_{HF}(s,t)}{\partial t} h_f \quad (7)$$

Where,
∂ is the partial differential symbol;
$p_{HF}$ is the pressure in the fracture, in Pa;
s is the coordinate of fracture length direction, in m;
μ is the fluid viscosity, in mPa·s;
$h_f$ is the hydraulic fracture height, in m;
$w_{HF}$ is the hydraulic fracture aperture, in m;
q is the flow in the hydraulic fracture, in m$^3$/s;
$q_L$ is the fracturing fluid loss rate, in m/s;
S is the fracturing fluid loss area, in m$^2$;
f is the fluid loss coefficient, in 1/m;
$p_p$ is the reservoir pore pressure, in MPa;
$u^+$ and $u^-$ are displacements on the left and right sides of the hydraulic fracture, in m;
n is the unit normal vector on the hydraulic fracture surface, dimensionless;
t is the fracturing time, in min.

Thirdly, establish the natural fracture failure model according to the Mohr-Coulomb rule, obtain the natural fracture aperture according to the natural fracture failure model, work out the natural fracture permeability based on the natural fracture aperture, and convert the fracture permeability into the permeability of the porous medium by the fracture continuum model. The natural fracture failure model is as follows:

$$\sigma_\tau > \tau_0 + \tan(\varphi_{basic})(\sigma_n - p_{NF}) \quad (8)$$

$$p_{NF} \geq \sigma_n + K_t \quad (9)$$

$$w_{NF} = a_0 + a_{NFT} + a_{NFS} \quad (10)$$

Where,
$\sigma_\tau$ is the shear stress on the natural fracture wall, in MPa;
$\tau_0$ is the natural fracture cohesion, in MPa;
$\varphi_{basic}$ is the basic friction angle, in °;
$\sigma_n$ is the normal stress on the natural fracture surface, in MPa;
$p_{NF}$ is the fluid pressure in the natural fracture, in MPa;
$K_t$ is the tensile strength of the natural fracture, in MPa;
$a_0$ is the initial aperture of the natural fracture, in m;
$a_{NFT}$ is the extensional aperture of the natural fracture, in m;
$a_{NFS}$ is the shear aperture of the natural fracture, in m.

Optionally, the basic friction angle is within a range from 30° to 40°.

Fourthly, couple the hydraulic fracture propagation calculation equation with the permeability of the porous medium through the fracture propagation criterion and the fluid loss to obtain a pore elastic model of the coupled natural fracture considering the influence of the natural fracture. The pore elastic model of the coupled natural fracture is as follows:

$$\nabla \cdot [\mu \nabla u + \mu \nabla u^T + \lambda ltr(\nabla u)] + \nabla \cdot \sigma_i - b\nabla p_p + b\nabla p_i = 0 \quad (11)$$

$$\left(\frac{1}{M} + \frac{b^2}{K_{dr}}\right)\frac{\partial p_p^n}{\partial t} - \frac{b^2}{K_{dr}}\frac{\partial p_p^{n-1}}{\partial t} + b\frac{\partial(\nabla \cdot u)}{\partial t} - \frac{k_{ij}}{\mu}(\nabla^2 p_p^n) = q \quad (12)$$

Where,
$\nabla$ is the Laplacian operator;
u is the displacement tensor, in m;
T is the matrix transpose;
$\lambda$ is the lame constant, in MPa;
Itr is the integral symbol;
$\sigma_i$ is the stress tensor, in MPa;
b is the Biot effective coefficient, dimensionless;
$p_i$ is the initial pore pressure, in MPa;
M is the Biot modulus, in MPa;
$K_{dr}$ is the bulk modulus in the drainage process, in MPa.

Finally, work out the stress and displacement distribution of the hydraulic fracture wall with the pore elastic model of the coupled natural fracture, and analyze the offset and discontinuity of the hydraulic fracture wall according to the displacement.

Embodiment 1

A typical unconventional reservoir in a block of Fuling is taken as the fractured reservoir to be simulated. The geological and construction parameters of the block are obtained through field logging and well testing, as shown in Table 1.

TABLE 1

Geological Parameters and Construction Parameters of Fractured Reservoir to be Simulated

| Parameters | Value | Parameters | Value |
| --- | --- | --- | --- |
| Displacement (m³/h) | 11 | Natural fracture spacing (m) | 0.4 |
| Fluid viscosity (MPa · S) | 10 | Rock compressibility (MPa⁻¹) | 4 × 10⁻³ |
| Total volume injected (m³) | 1500 | Fluid compressibility (MPa⁻¹) | 8 × 10⁻⁴ |
| Cluster spacing (m) | 10 | Natural fracture approaching angle (°) | 35 |
| Number of clusters | 1 | Natural fracture dip angle (°) | 90 |
| Model size (H × W × L) (m) | 40*60*400 | Vertical principal stress (MPa) | 55 |
| Initial pore pressure (MPa) | 35 | Horizontal minimum principal stress (MPa) | 54 |
| Matrix initial permeability (mD) | 0.01~0.1 | Horizontal maximum principal stress (MPa) | 60 |
| Initial porosity of the reservoir | 0.041 | Initial aperture of the natural fracture (m) | 10⁻⁴ |
| Elastic modulus (MPa) | 3 × 10⁴ | Poisson's ratio | 0.2 |

Establish a physical model of the natural fracture according to the geological parameters and the length, width, height and other physical conditions of natural fracture, as shown in FIG. 1.

Work out the natural fracture aperture according to the natural fracture failure model of Equations (8) to (10), and then calculate the natural fracture permeability with Equation (3), and finally convert the natural fracture permeability into the permeability of the porous medium with Equations (1) and (2).

Substitute Equations (4) to (6) into Equation (7) to obtain the hydraulic fracture propagation calculation equation, and couple the hydraulic fracture propagation calculation equation with the permeability of the porous medium through the fracture propagation criterion and the fluid loss to obtain pore elastic model of the coupled natural fracture considering the influence of the natural fracture.

Figure 3:
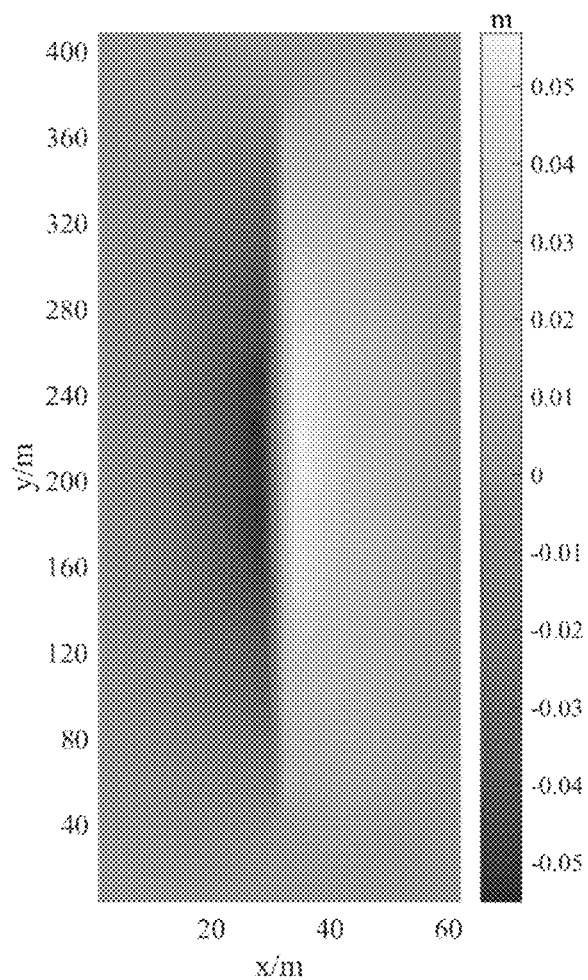
FIG. 3 is a cloud chart of displacement distribution after fracturing in Embodiment 1.
Figure 4:
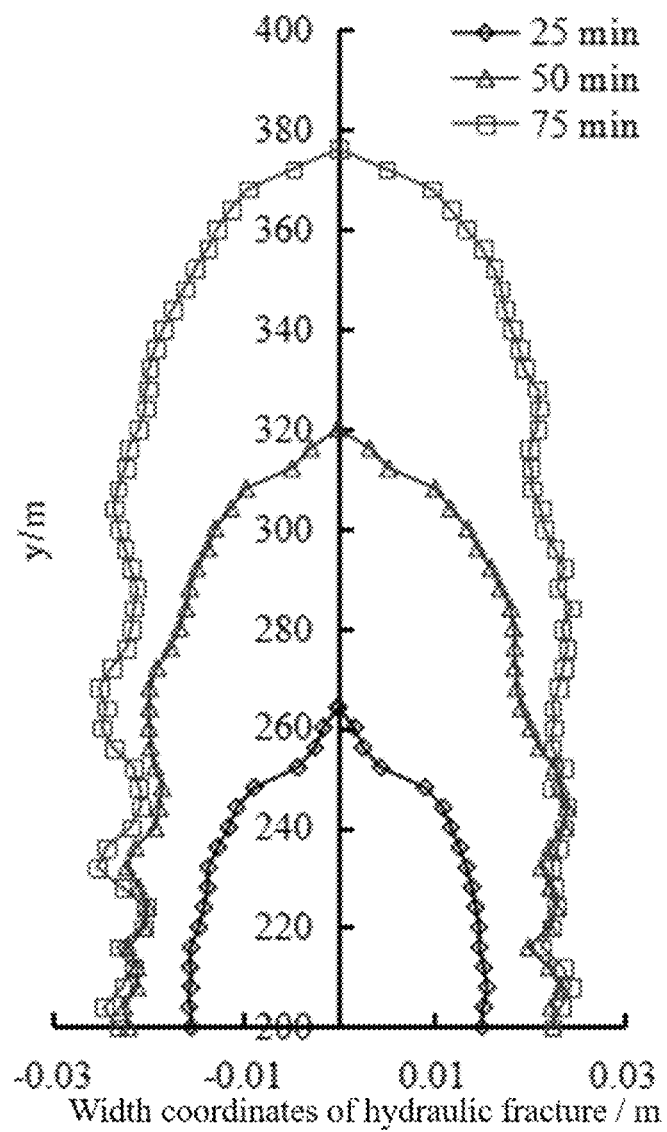
FIG. 4 is a schematic diagram of discontinuous distribution of the hydraulic fracture wall in Embodiment 1.

Work out the stress and displacement distribution (as shown in FIG. 3) of hydraulic fracture wall with the pore elastic model of the coupled natural fracture, and analyze the offset and discontinuity of the hydraulic fracture wall according to the displacement. The offset and discontinuity distribution of the hydraulic fracture wall, at 25 minutes, 50 minutes, and 75 minutes of the hydraulic fracturing, are shown in FIG. 4.

The above are only the preferred embodiments of the present invention, not intended to limit the present invention in any form. Although the present invention has been disclosed as above with the preferred embodiments, it is not intended to limit the present invention. Those skilled in the art, within the scope of the technical solution of the present invention, can use the disclosed technical content to make a few changes or modify the equivalent embodiment with equivalent changes. Within the scope of the technical solution of the present invention, any simple modification, equivalent change and modification made to the above embodiments according to the technical essence of the present invention are still regarded as a part of the technical solution of the present invention.

The invention claimed is:

1. A method for simulating a discontinuity of a hydraulic fracture wall in a fractured reservoir, applied to hydraulic fracturing in development of oil and gas fields, comprising the following steps:
   acquire geological parameters of the fractured reservoir, wherein the geological parameters are obtained by logging or fracturing;
   establish a physical model of a natural fracture based on the geological parameters and a fracture continuum model combined with a length, a width, a height and other physical conditions of the natural fracture;
   establish a hydraulic fracture propagation calculation equation on the basis of an in-fracture flow equation, a fluid loss equation, a width equation and a material balance equation;
   establish a natural fracture failure model according to a Mohr-Coulomb rule, work out a natural fracture aperture according to the natural fracture failure model, calculate a natural fracture permeability based on the natural fracture aperture, and convert the natural fracture permeability into a permeability of a porous medium by the fracture continuum model;
   wherein the fracture continuum model is as follows:

$$k_{ij} = k_{nf}\begin{bmatrix} (n_2)^2 + (n_3)^2 & -n_1 n_2 & -n_3 n_1 \\ -n_1 n_2 & (n_2)^2 + (n_3)^2 & -n_2 n_3 \\ -n_3 n_1 & -n_2 n_3 & (n_2)^2 + (n_3)^2 \end{bmatrix}; \quad (1)$$

where,
$k_{ij}$ is a matrix permeability tensor, in m²;
$k_{nf}$ is the natural fracture permeability, in m²;
$n_1$, $n_2$ and $n_3$ are calculated as follows:

$$n_1 = \cos\left(\varsigma\frac{\pi}{180}\right)\sin\left(\xi\frac{\pi}{180}\right) \quad (2)$$

$$n_2 = \cos\left(\varsigma\frac{\pi}{180}\right)\cos\left(\xi\frac{\pi}{180}\right)$$

$$n_3 = -\sin\left(\varsigma\frac{\pi}{180}\right);$$

where,
ç is a dip angle, in °;
ξ is a approaching angle, in °;
the natural fracture permeability $k_{nf}$ is calculated as follows:

$$k_{nf} = \frac{w_{NF}^3}{12d}; \quad (3)$$

where,
$w_{NF}$ is the natural fracture aperture, in m;
d is a natural fracture spacing, in m;
couple the hydraulic fracture propagation calculation equation with the permeability of the porous medium through a fracture propagation criterion and a fluid loss to obtain a pore elastic model of the natural fracture;
wherein the hydraulic fracture propagation calculation equation is worked out by substituting the in-fracture flow equation, the fluid loss equation and the width equation into the material balance equation; the substitution of the in-fracture flow equation, the fluid loss equation, the width equation and the material balance equation are as follows:

$$\frac{\partial p_{HF}}{\partial s} = -\frac{64\mu}{\pi h_f w_{HF}^3} q; \quad (4)$$

$$q_L = \frac{S}{\mu} f(p_{HF} - p_P); \quad (5)$$

$$w_{HF} = (u^+ - u^-) \cdot n; \quad (6)$$

$$\frac{\partial q(s,t)}{\partial s} = q_L(s,t) h_f + \frac{\partial w_{HF}(s,t)}{\partial t} h_f; \quad (7)$$

where,
∂ is a partial differential symbol;
$p_{HF}$ is a pressure in the fracture, in Pa;
s is a coordinate of fracture length direction, in m;
μ is a fluid viscosity, in mPa·s;
$h_f$ is a hydraulic fracture height, in m;
$w_{HF}$ is the hydraulic fracture aperture, in m;
q is a flow in the hydraulic fracture, in m³/s;
$q_L$ is a fracturing fluid loss rate, in m/s;
S is a fracturing fluid loss area, in m²;
f is a fluid loss coefficient, in 1/m;
$p_p$ is a reservoir pore pressure, in MPa;
$u^+$ and $u^-$ are displacements on the left and right sides of the hydraulic fracture, in m;
n is an unit normal vector on the hydraulic fracture surface, dimensionless;
t is a fracturing time, in min;
wherein the pore elastic model of the coupled natural fracture is as follows:

$$\nabla \cdot [\mu\nabla u + \mu\nabla u^T + \lambda ltr(\nabla u)] + \nabla \cdot \sigma_i - b\nabla p_p + b\nabla p_i = 0; \quad (11)$$

$$\left(\frac{1}{M} + \frac{b^2}{K_{dr}}\right)\frac{\partial p_p^n}{\partial t} - \frac{b^2}{K_{dr}}\frac{\partial p_p^{n-1}}{\partial t} + b\frac{\partial(\nabla \cdot u)}{\partial t} - \frac{k_{ij}}{\mu}(\nabla^2 p_p^n) = q; \quad (12)$$

where,
∇ is a Laplacian operator;
u is a displacement tensor, in m;
T is a matrix transpose;
λ is a lame constant, in MPa;
ltr is an integral symbol;
$\sigma_i$ is a stress tensor, in MPa;
b is a Biot effective coefficient, dimensionless;
$p_i$ is an initial pore pressure, in MPa;
M is a Biot modulus, in MPa;
$K_{dr}$ is a bulk modulus in the drainage process, in MPa; and
work out a distribution between a stress and a displacement of the hydraulic fracture wall with the pore elastic model of the natural fracture, and analyze the discontinuity of the hydraulic fracture wall according to the displacement of the hydraulic fracture wall.

2. The method for simulating a discontinuity of a hydraulic fracture wall in a fractured reservoir according to claim 1, wherein the geological parameters includes initial aperture of natural fracture, matrix initial permeability, initial porosity, elastic modulus and Poisson's ratio.

3. The method for simulating a discontinuity of a hydraulic fracture wall in a fractured reservoir according to claim 1, wherein the natural fracture failure model is as follows:

$$\sigma_\tau \geq \tau_0 + \tan(\varphi_{basic})(\sigma_n - p_{NF}) \quad (8)$$

$$p_{NF} \geq \sigma_n + K_t \quad (9)$$

$$w_{NF} = a_0 + a_{NFT} + a_{NFS} \quad (10)$$

Where,
$\sigma_\tau$ is the shear stress on the natural fracture wall, in MPa;
$\tau_0$ is the natural fracture cohesion, in MPa;
$\varphi_{basic}$ is the basic friction angle, in °;
$\sigma_n$ is the normal stress on the natural fracture surface, in MPa;
$p_{NF}$ is the fluid pressure in the natural fracture, in MPa;
$K_t$ is the tensile strength of the natural fracture, in MPa;
$a_0$ is the initial aperture of the natural fracture, in m;
$a_{NFT}$ is the extensional aperture of the natural fracture, in m;
$a_{NFS}$ is the shear aperture of the natural fracture, in m.

4. The method for simulating a discontinuity of a hydraulic fracture wall in a fractured reservoir according to claim 3, wherein the basic friction angle is within a range from 30° to 40°.

\* \* \* \* \*